United States Patent Office 3,689,483
Patented Sept. 5, 1972

3,689,483
REMOVAL OF A LOWER CARBOXYLIC ACID FROM A SOLUTION OF CEPHALEXIN THEREIN
Hugh McCorquodale, Montrose, Angus, Scotland, and Phillip Thomas Siddons, Pinner, England, assignors to Glaxo Laboratories Limited, Greenford, Middlesex, England
No Drawing. Filed Aug. 10, 1970, Ser. No. 62,705
Claims priority, application Great Britain, Sept. 26, 1969, 47,572/69
Int. Cl. C07d 99/24
U.S. Cl. 260—243 C          1 Claim

ABSTRACT OF THE DISCLOSURE

A method of removing a lower carboxylic acid from a solution of cephalexin or of 7β-amino-3-methylceph-3-em-4-carboxylic acid containing the lower carboxylic acid comprises contacting the solution with methanol in the presence of an acid catalyst to form the corresponding methyl carboxylate and distilling off the methyl carboxylate.

---

This invention is concerned with the purification of 7β-(D - 2 - aminophenylacetamido) - 3 - methylceph-3-em-4-carboxylic acid (common name cephalexin) and 7β-amino-3-methylceph-3-em-4-carboxylic acid which is a precursor for cephalexin.

The cephalosporin compounds referred to in this specification are generally named with reference to cepham (see J.A.C.S. 1962, 84, 3400 and J. Chem. Soc. 1965, 5031). The term "cephem" refers to the basic cepham structure with one double bond.

Cephalexin may be prepared e.g. by reduction with zinc/acid of 2,2,2-trichloroethyl 7β-[D(—)-N-(2,2,2-trichloroethoxycarbonyl) - 2 - aminophenylacetamido] - 3 - methylceph-3-em-4-carboxylate or the like precursor. Such precursors may be obtained from penicillin compounds by a multi-stage method involving ring expansion of a penicillin compound such, for example, as is described in U.S. Pat. No. 3,275,626. Residual zinc may be removed by filtration. However, when the acid is, for example, formic acid it has been necessary to remove this acid by distillation. This may be a prolonged operation. Similar problems arise in the purification of 7β-amino-3-methylceph-3-em-4-carboxylic acid.

It is an object of the present invention to provide an improved method of removing lower carboxylic acids from crude solutions of cephalexin or of 7β-amino-3-methylceph-3-em-4-carboxylic acid. By the term "lower carboxylic acid" as used herein we mean formic acid or acetic acid.

According to the present invention there is provided a method of removing a lower carboxylic acid from a solution of cephalexin or of 7β-amino-3-methylceph-3-em-4-carboxylic acid containing said lower carboxylic acid which comprises contacting said solution with methanol in the presence of an acid catalyst, preferably hydrochloric acid, having a pKa less than that of said lower carboxylic acid for a sufficient period of time to allow said lower carboxylic acid present to form the corresponding methyl carboxylate and distilling off said methyl carboxylate.

By proceeding according to the invention the lower carboxylic acid can be readily converted to its methyl carboxylate which in turn can easily be removed by distillation.

In the case of cephalexin, the residual aqueous solution may be subjected to a further purification as described in application No. 62,706, filed on even date wherein there is described a process for the purification of crude cephalexin which comprises contacting a crude acidic, aqueous solution of cephalexin with methanol, adjusting the pH of the solution to about 4 to initiate crystallisation of the cephalexin, thereafter, if desired, adding a non-solvent for cephalexin, e.g. a ketone, and separating off the mother liquor after crystallisation has taken place to the desired extent.

The distillation of methyl carboxylate may be carried out under reduced pressure, preferably at a pressure such that all of the methyl carboxylate may be removed without the need to raise the temperature of the aqueous solution substantially above ambient temperature.

Thereafter, in the case of cephalexin, the residual aqueous solution may be subjected to the process of said copending application preceded if desired by solvent extraction to remove other impurities.

The quantity of methanol added to the aqueous solution containing the lower carboxylic acid is not critical; however, if it is desired to link the method according to the present invention with that described in said copending application it is preferable that the volume of methanol added should be at least equal to that of the aqueous solution.

In order that the invention may be well understood the following examples are given by way of illustration only. Example 1 illustrates the method according to the invention in conjunction with an ether extraction.

EXAMPLE 1

A solution of 2,2,2-trichloroethyl 7β[D(—)-N-(2,2,2-trichloroethoxycarbonyl) - 2 - aminophenylacetamido]-3-methylceph-3-em-4-carboxylate containing 0.5 mole of methylisobutyl ketone (2.7 kg.) in 98% formic acid (11.0 litres) was treated zinc dust (2.16 kg.). After the reaction and removal of zinc the reaction volume was ca. 18 litres. The solution was concentrated in vacuo to 9.2 litres and methanol (13.3 litres) containing concentrated hydrochloric acid (324 ml.) was added. The mixture was evaporated under reduced pressure (20" Hg) until the internal temperature had risen to 35° and no more methyl formate distilled off (ca. 0.75 hour). The solution was poured into ether (21.5 litres) and the aqueous layer was separated. The ethereal layer was washed with water (2× 650 ml.) and the combined aqueous-methanolic layers were evaporated until dissolved ether was removed. Acetic acid (430 ml.) was added and the mixture was warmed to 40° and taken to pH 4.0 with triethylamine. The mixture was cooled overnight, diluted with acetone (10 litres) and re-cooled for 2 hours. Filtration gave the product, cephalexin 71.7% yield (theory); $[\alpha]_D + 150°$ (c. 1.0 in $H_2O$), $\lambda_{max}$. 261 nm.;

$$E_{1\,cm}^{1\%} \; 218 \text{ in } H_2O$$

n.m.r. and infrared spectra identified the material as cephalexin.

EXAMPLE 2

A formic acid solution of cephalexin was obtained as described in Example 1 but starting from 50 g. of the protected compound. The solution was concentrated in vacuo to 50 ml. and diluted with methanol (75 ml.) containing concentrated hydrochloric acid (6 ml.). The mixture was heated under reduced pressure (508 mm. Hg) until no more methyl formate distilled off (ca. 0.5 hour) and was then diluted to 150 ml. with methanol. The pH was adjusted to 4.0 with triethylamine and the mixture was allowed to stand for 1 hour and was then diluted with acetone to 300 ml. The mixture was cooled for 1 hour and filtered to give cephalexin (15.2 g.) 62% yield (theory) having $[\alpha]_D +148°$ (c. 1.0 in $H_2O$). $\lambda_{max.}$ 261 nm.;

$E_{1 cm.}^{1\%}$ 214 in $H_2O$ n.m.r. spectrum as standard.

EXAMPLE 3

A solution of 2,2,2-trichloroethyl 7β-[D(−)-N-(2,2,2-trichloroethoxycarbonyl) - 2 - aminophenylacetamido]-3-methylceph-3-em-4-carboxylate containing 0.5 mole of methyl isobutyl ketone (300 g.) in 98% formic acid (1.2 litres) was treated with a suspension of zinc dust (225 g.). After reaction and removal of zinc the reaction volume was ca. 2.5 litres. The solution was concentrated in vacuo to 1 litre and divided into 6 parts which were treated as follows:

(a) The solution was diluted with methanol (246 ml.) containing concentrated hydrochloric acid (6 ml.). The solution was evaporated under reduced pressure (508 mm. Hg) until no more methyl formate distilled off (35 minutes) and was then extracted with ether (400 ml.). The aqueous layer was separated and the ethereal layer was washed with water (2× 12 ml.). The combined aqueous layers were evaporated to remove ether and diluted to 200 ml. with methanol. The pH of the warm (40°) solution was adjusted to 4.0 with triethylamine and the mixture was diluted with acetone (200 ml.) and cooled. Filtration gave cephalexin in 75.6% yield (theory) having $[\alpha]_D +148°$ (c. 1.0 in $H_2O$) $\lambda_{max.}$ 261 nm.;

$E_{1 cm.}^{1\%}$ 219 in $H_2O$ (b) The solution was treated in a similar manner with sulphuric acid (2.1 ml.) in place of hydrochloric acid. The distillation of methyl formate required 50 minutes. Cephalexin was obtained in 70.8% yield (theory) having $[\alpha]_D +149.5°$ (c. 1.0 in $H_2O$) $\lambda_{max.}$ 261 nm.;

$E_{1 cm.}^{1\%}$ 224 in $H_2O$ (c) The solution was treated in a similar manner with 30% perchloric acid (18 ml.) as the acid catalyst. The distillation of methyl formate took 35 minutes. Cephalexin was obtained in 73.7% yield (theory) having $[\alpha]_D +147.5°$ (c. 1.0 in $H_2O$) $\lambda_{max.}$ 261 nm.;

$E_{1 cm.}^{1\%}$ 221 in $H_2O$ (d) The solution was treated in a similar manner with phosphorus oxychloride (2 ml.) as the catalyst. Methyl formate distillation required 35 minutes. Cephalexin was obtained in 73.4% yield (theory) having $[\alpha]_D +148.5°$ (c. 1.0 in $H_2O$) $\lambda_{max.}$ 261 nm.;

$E_{1 cm.}^{1\%}$ 217 in $H_2O$ (e) The solution was treated in a similar manner with Amberlyst 15 resin (6 g.) as the catalyst. The distillation of methyl formate required 2 hours. Cephalexin was obtained in 60.7% yield (theory) having $[\alpha]_D +150.5°$ (c. 1.0 in $H_2O$) $\lambda_{max.}$ 261 nm.;

$E_{1 cm.}^{1\%}$ 223 in $H_2O$ (f) The solution was treated in a similar manner with p-toluenesulphonic acid hydrate (13.5 g.) as the catalyst. Distillation of the methyl formate required 40 minutes. Cephalexin was obtained in 60.4% yield (theory) having $[\alpha]_D +147.5°$ (c. 1.0 in $H_2O$) $\lambda_{max.}$ 261 nm.;

$E_{1 cm.}^{1\%}$ 216 in $H_2O$

EXAMPLE 4

A suspension of 2,2,2-trichloroethyl 7β-[D(−)-N-(2,2,2 - trichloroethoxycarbonyl) - 2 - aminophenylacetamido]-3-methylceph-3-em-4-carboxylate containing 0.5 mole of methyl isobutyl ketone (50 g.) in 95% acetic acid (200 ml.) was treated with zinc dust. After the reaction and removal of zinc the reaction volume was about 400 ml. The solution was concentrated to 238 ml. and methanol (250 ml.) containing concentrated hydrochloric acid (10 ml.) was added. Methyl acetate was distilled out of the mixture at 40° under reduced pressure during 2.5 hours. The residue was extracted with ether (400 ml.) and the aqueous layer was separated. The ether was washed with water (15 ml., + 2× 10 ml.+4× 5 ml.) and the combined aqueous layers were evaporated in vacuo to remove ether and diluted to 200 ml. with methanol. The pH was adjusted to 4.0 with triethylamine and cooled and filtered to give cephalexin in 42% yield (theory) having $[\alpha]_D +147°$ (c. 1.0 in $H_2O$) $\lambda_{max.}$ 261 nm.;

$E_{1 cm.}^{1\%}$ 221

EXAMPLE 5

A suspension of 2,2,2-trichloroethyl 7β-amino-3-methylceph-3-em-4-carboxylate toluene p-hydrosulphonate (75 g.) in 98% formic acid (150 ml.) was treated with a suspension of zinc dust (37.5 g.) in 98% formic acid (75 ml.). After the reaction and removal of zinc and zinc salts, the reaction volume was about 100 ml. Methanol (150 ml.) and concentrated hydrochloric acid (6 ml.) were added. The mixture was evaporated under reduced pressure until no more methyl formate distilled off. The residual solution was diluted with water (400 ml.) and taken to pH 4 with aqueous ammonia. The mixture was aged at 0° for 2 hours and the product collected by filtration to give 7β - amino - 3 - methylceph-3-em-4-carboxylic acid in 94% yield (theory); $[\alpha]_D^{20} +153°$ (c. 0.25 in pH 7 phosphate buffer), $\lambda$ 263 nm.;

$E_{1 cm.}^{1\%}$ 323 in pH 7 buffer

We claim:
1. A method of removing a lower carboxylic acid selected from the group consisting of formic acid and acetic acid from a solution of cephalexin or of 7β-amino-3-methylceph-3-em-4-carboxylic acid in said lower carboxylic acid, which comprises contacting said solution with methanol in the presence of an acid catalyst having a pKa less than that of said lower carboxylic acid for a sufficient period of time to convert said lower carboxylic acid present to the corresponding methyl lower carboxylate and distilling off said methyl lower carboxylate.

References Cited
UNITED STATES PATENTS

| | | | |
|---|---|---|---|
| 3,467,654 | 9/1969 | McCormick et al. | 260—243 C |
| 3,522,248 | 7/1970 | Voser | 260—243 C |
| 3,594,371 | 7/1971 | McIntyre | 260—243 C |

NICHOLAS S. RIZZO, Primary Examiner